US006178656B1

(12) United States Patent
Jung

(10) Patent No.: US 6,178,656 B1
(45) Date of Patent: Jan. 30, 2001

(54) METHOD AND DEVICE FOR MECHANICALLY ADJUSTING GRADUATION-SCALE CARRIER MEMBERS

(75) Inventor: Werner Jung, Traunreut (DE)

(73) Assignee: Dr. Johannes Heidenhain GmbH, Traunreut (DE)

( * ) Notice: Under 35 U.S.C. 154(b), the term of this patent shall be extended for 0 days.

(21) Appl. No.: 09/233,892

(22) Filed: Jan. 20, 1999

(30) Foreign Application Priority Data

Jan. 21, 1998 (DE) .............................................. 198 02 036

(51) Int. Cl.$^7$ ....................................................... A45B 3/08
(52) U.S. Cl. .................................. 33/706; 33/702; 33/707
(58) Field of Search ............................. 33/702, 703, 704, 33/705, 706, 707, 708

(56) References Cited

U.S. PATENT DOCUMENTS

| | | | |
|---|---|---|---|
| 1,933,446 | * 10/1933 | Olson | 33/700 |
| 4,363,964 | * 12/1982 | Schmitt | 250/237 G |
| 4,479,716 | * 10/1984 | Nelle | 356/374 |
| 4,569,138 | * 2/1986 | Tute | 33/700 |
| 4,684,257 | * 8/1987 | Hanaoka et al. | 356/374 |
| 4,926,566 | * 5/1990 | McMurtry et al. | 33/771 |
| 5,088,209 | * 2/1992 | Lummes et al. | 33/707 |

* cited by examiner

Primary Examiner—Christopher W. Fulton
Assistant Examiner—Faye Francis
(74) Attorney, Agent, or Firm—Kenyon & Kenyon

(57) ABSTRACT

A device and a method for mechanically adjusting graduation-scale carrier members, which form a scale for a preferably incremental measuring system. The device and the method can be used both for angle measuring instruments as well as for length measuring instruments. A wedge-shaped form-locking between segments of the graduation-scale carrier members and fixing elements enables forces produced by setting screws orthogonally to the measuring direction and exerted on the fixing elements to be varied in their effective direction, so that they have a component that is parallel to the measuring direction and, thus, to the extension of the graduation-scale carrier member. As a result, the setting screws can be used to exert a compressive or tensile force on the graduation-scale carrier member to be used for the adjustment thereof. The gap width at the joint of two graduation-scale carrier members can be adjusted in the same way as is the graduation-scale carrier member. The wedge-shaped segments arranged on the graduation-scale carrier members and the wedge-shaped fixing elements cause the forces exerted on the fixing elements by setting screws to be diverted in the measuring direction at the graduation-scale carrier members and, in such a way, that the gap width of the joint is adjusted.

6 Claims, 4 Drawing Sheets

METHOD AND DEVICE FOR MECHANICALLY ADJUSTING GRADUATION-SCALE CARRIER MEMBERS

FIELD OF THE INVENTION

The present invention relates generally to scales and more particularly to a device and method for mechanically adjusting graduation-scale carrier members.

RELATED TECHNOLOGY

A device and a method for mechanically adjusting graduation-scale carrier members are disclosed in German Patent No. 27 27 769 C2 for a joint (side-by-side surfaces) between two side-by-side mounted graduation-scale carrier members. The patent describes assembling a scale standard of a linear measuring device from individual graduation-scale carrier members. Graduations, which supply incremental positional data during an optical scanning operation, are arranged on the individual graduation-scale carrier members. A scale construction of this kind is selected in particular when the scale that is needed is no longer able to be manufactured in one piece due to the substantial measuring length required of the measuring system. However, a problem encountered when working with a scale assembled from a plurality of graduation-scale carrier members is that when the gap separation at the joints of adjacent graduation carriers is not optimally adjusted, errors occur when positional determinations are made. For this reason, the aforementioned patent proposes making an adjustment to adjacent graduation-scale carrier members at the joints. The suitable adjustment elements include pressing means to permit the graduation-scale carrier member to be assembled with an interference fit, but nevertheless in an adjustable manner in the joint area.

What is disadvantageous in the context of this patent is that the device is relatively expensive. Another drawback is that it can only be used at joints between graduation-scale carrier members. Furthermore, considerable space is required for the adjustment elements.

A length or angle measuring instrument and a related method for making linear adjustments are disclosed in European Patent Application No. 150 354 A2. In this context, the measuring graduation-scale carrier member can be expanded or compressed to adjust the carrier member linearly. The device includes a graduation-scale carrier member that is perforated in the measuring direction. Torque is exerted on gear wheels, forcing them into engagement with these perforations. In response to the acting torque, the sections between two gear wheels are expanded or compressed in length until the desired linear adjustment is reached, and the gear wheels are subsequently fixed in position.

Here, the drawback is that this device is not able to adjust the gap width at joints of adjacent graduation-scale carrier members. A further disadvantage is the costly construction and the substantial space requirements it entails.

SUMMARY OF THE INVENTION

An object of the present invention is to provide a method and a device for mechanically adjusting graduation-scale carrier members, which can be used both for performing linear adjustments in the area of a graduation-scale carrier member, as well as to adjust the gap width at the joints between two graduation-scale carrier members. A further object is to be able to adjust disk-shaped graduation-scale carrier members. The device preferably has a small space requirement and renders possible a simple, as well as precise, adjustment.

The present invention provides a device for mechanically adjusting graduation-scale carrier members and joints between graduation-scale carrier members, which form the scale of a preferably incremental linear or angle measuring instrument, by changing the effective length of the graduation-scale carrier members or of the gap width at the joint. In the graduation-scale carrier member (2, 10, 20), cut-outs are provided. Adjusting devices mesh with the cutouts. Provision is made in the graduation-scale carrier member (2, 10, 20) for wedge shaped segments (11a, 11b, 21a, 21b, 21c). Adjusting elements (6a–6h, 7a, 7b, 7a1, 7a1, 7b1, 7b2, 12a, 12b, 13a, 13b, 22, 23a, 23b, 31, 32) surround the wedge-shaped segments (11a, 11b, 21a, 21b, 21c) with at least partial form-locking.

The present invention also provides a method for mechanically adjusting graduation-scale carrier members and joints (1) between graduation-scale carrier members, which form the scale of a preferably incremental linear or angle measuring instrument, by changing the effective length of the graduation-scale carrier members or of the gap width at the joint. In the graduation-scale carrier member (2, 10, 20), cut-outs are provided into which adjusting devices mesh. When an adjustment is made to setting screws (6a–6f, 13a, 13b, 23a, 23b, 32), different starting torques are exerted; this force exerted orthogonally to the measuring direction using the setting screws (6a–6f, 13a, 13b, 23a, 23b, 32) onto the fixing elements (7a, 7b, 12a, 12b, 22, 31) is converted by the wedge-shaped form locking connections between the fixing elements (7a, 7b, 12a, 12b, 22, 31) and the segments (11a, 11b, 21a, 21b, 21c) of the graduation-scale carrier members (2, 3, 10, 20) into a force on the graduation-scale carriers (2, 3, 10, 20), which has a component that is parallel and orthogonal to the measuring direction (x), enabling the graduation-scale carrier members (2, 3) to be fixed orthogonally to the measuring direction (x) and shifted in parallel to the measuring direction (x).

Further advantageous features of the device may include: (a) that the adjusting elements (6a–6h, 7a, 7b, 12a, 12b, 13a, 13b, 22, 23a, 23b, 31, 32) include fixing elements (7a, 7b, 7a1, 7a2, 7b1, 7b2, 12a, 12b, 22, 31), which have a wedge-shaped Cut-out or a wedge-shaped protuberance, and include setting screws (6a–6h, 13a, 13b. 23a, 23b, 32); (b) that the wedge-shaped cut-outs at the fixing elements (7a, 7b, 12a, 12b, 22) are designed to be slightly smaller than the wedge-shaped segments (11a, 11b, 21a, 21b, 21c) of the graduation-scale carrier member (2, 10, 20); and/or (c) that provision is made in the area of one joint (1) of two graduation-scale carrier members (2, 3) for wedge-shaped segments on both graduation-scale carrier members (2, 3), and each fixing element (7a, 7b) has two wedge-shaped cut-outs, which each enter into a form-locking connection with segments of different graduation-scale carrier members (2, 3).

In accordance with the present invention, adjustment elements having wedge-shaped cut-outs cooperate with wedge-shaped segments on the graduation-scale carrier members. The wedge-shaped cut-outs of the adjustment elements are pressed with an adjustable pressure onto the wedge-shaped segments of the graduation-scale carrier members. The wedge-shaped form of the adjustment elements and of the segments produces a force component, which acts in the longitudinal extension direction of the graduation. This enables a graduation-scale carrier member or a joint between two graduation-scale carrier members to be adjusted by varying the pressure used to press the adjustment elements onto the graduation-scale carrier members.

Performing a linear adjustment to adjacent graduation-scale carrier members in accordance with the method and device of the present invention is also easily done. For this, wedge-shaped segments, capable of being adjusted by a common adjusting element, are provided on both adjacent ends of the graduation-scale carrier members.

Furthermore, the device and the method of the present invention are also suited for performing an adjustment on round graduation-scale carrier members, as used in angle measuring instruments.

The device or the method of the present invention can be used directly at the location, i.e., the individual graduation-scale carrier members that constitute a scale can be assembled and precisely adjusted in one sequence of operation. Moreover, the device according to the present invention only requires little additional space, so that a compact realization is possible.

In this context, the device or the method of the present invention can, of course, be used in conjunction with length or angle measuring instruments, which work according to different physical principles, for example, in optical or magnetic measuring instruments.

BRIEF DESCRIPTION OF THE DRAWINGS

The following description of an exemplary embodiment elucidates the device and method of the present invention and advantages thereof, with reference to the drawings, in which.

DETAILED DESCRIPTION

Figure 1:
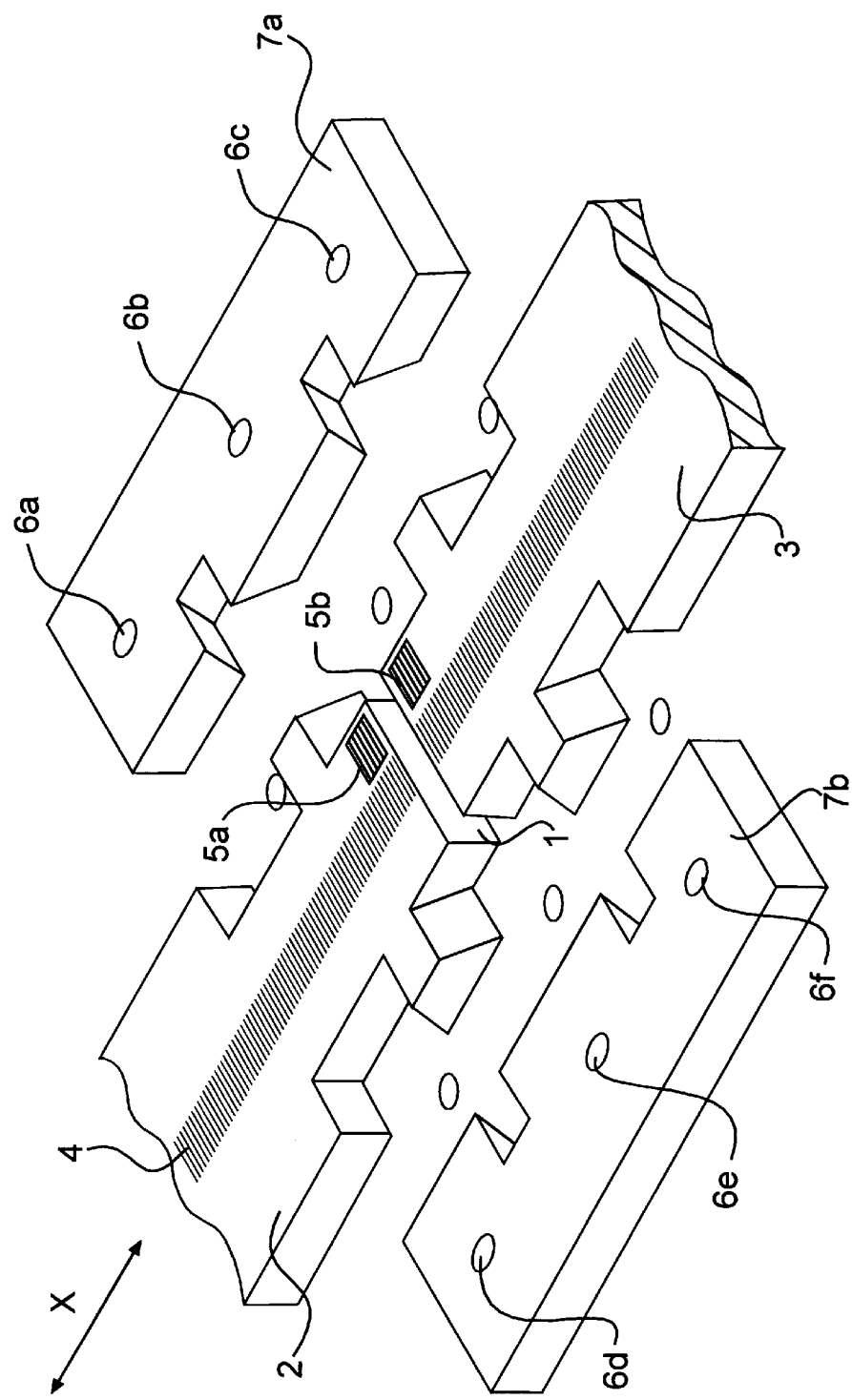
FIG. 1 shows a perspective representation of the joint between two adjacent graduation-scale carrier members having adjusting elements.

FIG. 1 shows a perspective view of subassemblies, which are not yet fixed in position, used to assemble two adjacent, separate graduation-scale carrier members 2, 3 with dimensional accuracy and to adjust a joint 1, to form a scale. The two graduation-scale carrier members 2, 3 each form part of the scale of a length measuring instrument, which is made up of a plurality of graduation-scale carrier members 2, 3 of this kind. In the depicted exemplary embodiment, a scale is scanned by an incident-light scanner in a measuring operation to produce incremental positional data in a known manner. The scale is of modular construction, i.e., it is made up of individual graduation-scale carrier members 2, 3. This modular construction makes it possible to simply adapt the required scale length to the measuring distance required in the particular case.

The length measuring instrument provided in the depicted exemplary embodiment of FIG. 1 functions according to the incident light principle; this means graduation-scale carrier members 2, 3 are reflecting graduation-scale carrier members, upon which the graduation structures (division marks) 4, 5a, 5b are arranged. These are made up in a well known manner of a periodic sequence of reflecting and non-reflecting regions in measuring direction x. To produce the incremental positional data, in this case a scale graduation structure having incremental divisions 4 is arranged on the graduation-scale carrier members 2, 3. Laterally adjacent to incremental divisions 4, provision is made for a second scale graduation structure, within which are configured a plurality of reference marks 5a–5b. Reference marks 5a–5b are formed in a well known manner and are used in a measuring operation to make available absolute positional information.

In the area of joint 1 of adjacent graduation-scale carrier members 2, 3, the two graduation-scale carrier members 2, 3 are able to be adjusted in relation to one another. For this purpose, adjustment elements formed as setting screws 6a–6f and as fixing elements 7a, 7b are used in the illustrated exemplary embodiment. Fixing elements 7a and 7b for graduation-scale carrier members 2, 3 are secured via setting screws 6a–6f to a base 30, for example to the bed of a machine tool. For setting screws 6a–6f, fixing elements 7a and 7b have corresponding tapped bores. In this context, a fixing element 7a, 7b of this kind is provided for both sides of adjacent graduation-scale carrier members 2, 3. Each of fixing elements 7a, 7b can be secured using three setting screws 6a–6f. By applying a defined torque for setting screws 6a–6f, the two adjacent ends of graduation-scale carrier members 2, 3 can be simultaneously adjusted. In particular, by using two fixing elements 7a, 7b, the device shown renders possible the simultaneous adjustment of the two adjacent graduation-scale carrier members 2, 3 in the joint area.

Cut-outs and segments are formed on graduation-scale carrier members 2, 3 and fixing elements 7a, 7b in such a way that the wedge-shaped cut-outs of fixing elements 7a, 7b mate with the wedge-shaped segments of graduation-scale carrier members 2, 3. The special wedge-shaped form of those surfaces of the segments and cut-outs that come into contact with one another enable the graduation-scale carrier members to be slightly shifted in relation to one another due to the different contact pressures exerted by setting screws 6a–6f. Tightening setting screws 6b and 6e with a greater torque than screws 6a, 6c, 6d and 6f enlarges the gap width between adjacent graduation-scale carrier members 2, 3 at joint 1, since the two wedge-shaped segments in the middle of fixing elements 7a, 7b push the two ends of the graduation-scale carrier members apart; at the same time, due to the smaller torque of the setting screws 6a, 6c, 6d, and 6f, the wedge-shaped segments of graduation-scale carrier members 2, 3 can move slightly underneath the segments at the ends of fixing elements 7a, 7b. The linear adjustment is thus performed by loosening or tightening setting screws 6a–6f to achieve the desired effect.

When a scale that includes graduation-scale carrier members 2, 3 is assembled at a machine, initially a first graduation-scale carrier member 2 is secured using an adhesive bond; subsequently the end of a second graduation-scale carrier member 3 adjacent to the first graduation-scale carrier member in the measuring direction x is bonded. Fixing elements 7a and 7b are then used to adjust the gap width of joint I by suitably loosening or tightening setting screws 6a–6f to achieve a gap width that is, to the extent possible, an integral multiple of the graduation period of divisions 4 applied to the graduation-scale carrier members 2, 3. In the process, the deviation in the gap width at joint 1 from an integral multiple of the graduation period should be less than 10% of the width of one graduation period. After the gap width is adjusted at joint 1, the other end of graduation-scale carrier member 3 is bonded to the substructure and the next graduation-scale carrier member in each instance is secured and adjusted in the same manner until the desired measuring length is achieved.

Figure 5:
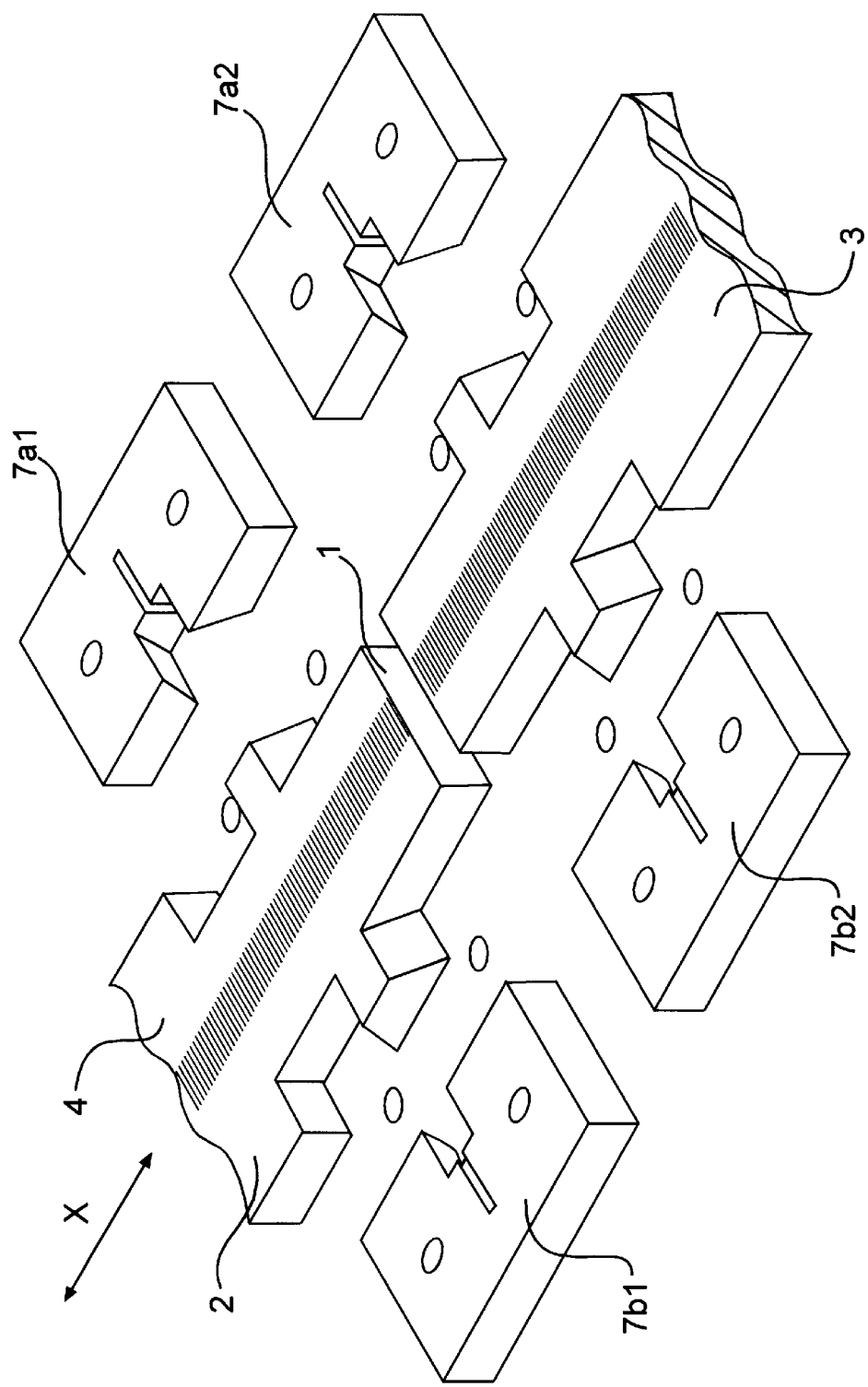
FIG. 5 shows an alternative realization of the fixing elements from FIG. 1.

Alternatively, to adjust the gap width at the joint between two graduation-scale carrier members, fixing elements 7a and 7b can each be designed in two parts as fixing elements 7a1, 7a2 and 7b1, 7b2, as shown in FIG. 5. Here, as well, as already described, the wedge-shaped configuration of the segments of graduation-scale carrier members 2 and 3, as well as of the corresponding cut-outs at fixing elements 7a1, 7a2, 7b1 and 7b2 make it possible for graduation-scale carrier members 2 and 3 to be fixed in position on a substructure, and for the gap width of joint 1 to be adjusted. The adjustment is again performed by varying the starting torque of the fixing screws of fixing elements 7a1, 7a2, 7b1 and 7b2.

Figure 2:
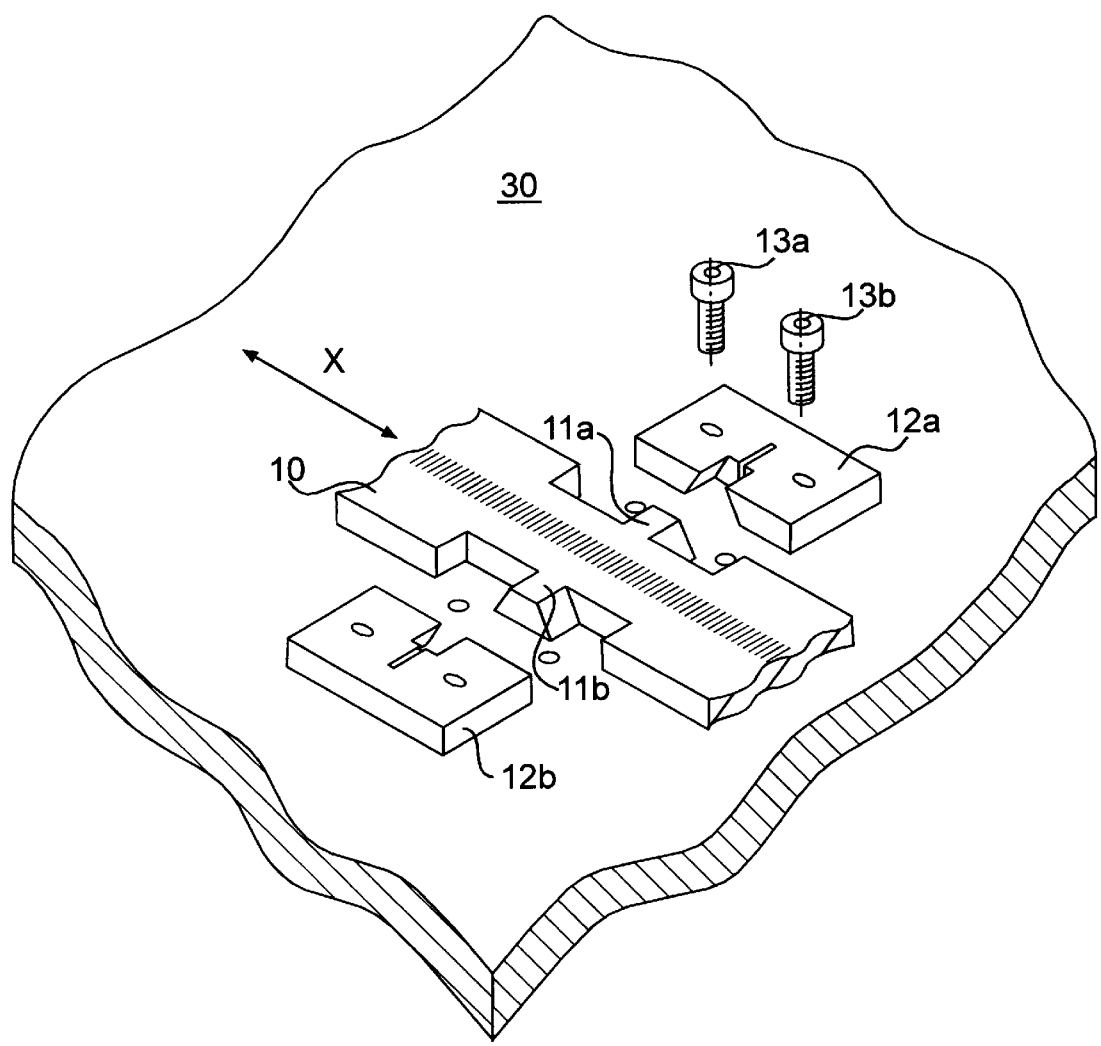
FIG. 2 shows a perspective representation of a graduation-scale carrier member having adjusting elements and segments for a length measuring instrument.

Also possible in accordance with this principle is a linear adjustment within the area of one single graduation-scale carrier member 10, as shown in FIG. 2. Wedge-shaped segments 11a, 11b, which cooperate with fixing elements 12a, 12b having a wedge-shaped cut-out, can be configured at evenly spaced intervals over the length of both sides of a graduation-scale carrier member 10. Fixing elements 12a, 12b each have two bores for setting screws 13a, 13b, which are used to secure fixing elements 12a, 12b to a substructure, for example to a machine tool bed. Graduation-scale carrier member 10 is arranged to be displaceable with respect to the substructure. Since the cut-outs of fixing elements 12a, 12b are designed to be slightly smaller than segments 11a, 11b on graduation-scale carrier member 10, a compressive or a tensile force can be exerted on graduation-scale carrier member 10 by varying the torque when tightening the two setting screws 13a, 13b. If setting screw 13a is tightened with a greater torque than setting screw 13b, a compressive force is exerted on the part of graduation-scale carrier member 10 disposed to the right of segment 11a, 11b, and a tensile force on the part disposed to the left, and vice versa. The linear adjustment of graduation-scale carrier member 10 is achieved through application of these forces.

Figure 3:
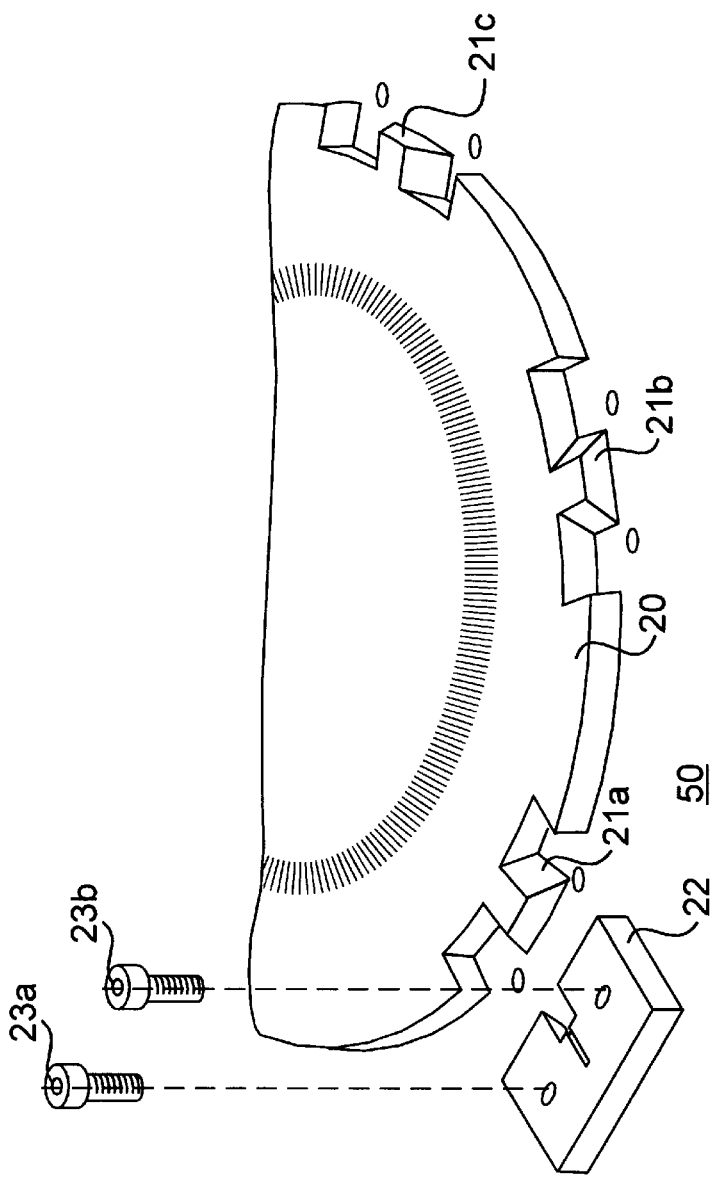
FIG. 3 shows a perspective representation of a graduation-scale carrier member having adjusting elements and segments for an angle measuring instrument.

FIG. 3 depicts the application of the principle already described with respect to FIG. 2 when working with a graduation-scale carrier member 20 for an angle measuring instrument. Even in the case of a round graduation-scale carrier member 20, it is possible to configure wedge-shaped segments 21a, 21b, 21c at evenly spaced intervals on graduation-scale carrier member 20. These segments 21a, 21b, 21c can be arranged both on the outer diameter, or also further inside the graduation-scale carrier member. Here, adjustment elements 22, 23a, 23b are also provided, whose fixing elements 22 have a wedge-shaped cut-out. Each fixing element 22 is secured by setting screws 23a, 23b to the substructure or base 50 where graduation-scale carrier member 20 is displaceably mounted. By varying starting torques for each of the two setting screws 23a or 23b of an adjusting element, one can exert a tensile force or a compressive force in a desired direction, as is already described in the description for FIG. 2.

Figure 4:
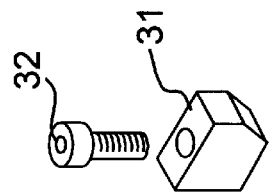
FIG. 4 shows one possible embodiment of an adjusting element.

In an alternative specific embodiment, fixing elements 22, 12a, 12b, 7a, 7b can also have a two-part design, as explained by reference to FIG. 4. Instead of the wedge-shaped cut-out, fixing elements 31 then have a wedge-shaped protuberance. When an adjustment is performed on a graduation-scale carrier member 10, 20, each segment 21a, 21b, 21c, 11a, 11b is then fixed in position by two wedge-shaped fixing elements 31. For this, setting screws 32 are used to secure fixing elements 31 in the desired position, to the right and left of segment 21a, 21b, 21c, 11a, 11b to be fixed. A force can be exerted, in turn, in the one or other direction depending on the torque applied to setting screw 32 to secure the two fixing elements 31 assigned to one single segment, thus enabling an adjustment to be performed on the graduation-scale carrier member.

What is claimed is:

1. An adjustable scale comprising:
   a first graduation-scale carrier member having a measuring direction and including a wedge-shaped segment; and
   an adjusting element contacting the wedge-shaped segment for adjusting the first graduation-scale carrier member in the measuring direction and for attaching the first graduation-scale carrier member to a base, the adjusting element being moveable with respect to the base in a direction orthogonal to the measuring direction, the adjusting element having surfaces urging the first graduation-scale carrier member in the measuring direction when the adjusting element moves in a direction orthogonal to the measuring direction.

2. A device for mechanically adjusting a first graduation-scale carrier member relative to a base in a measuring direction, a cut-out being provided in the first graduation-scale carrier member, the device comprising;
   an adjusting device for mating with the cut-out, the first graduation-scale carrier member having a wedge-shaped segment, and the adjusting device including a fixing element surrounding the wedge-shaped segment and setting screws fastening the adjusting device to the base, the fixing element having a wedge shaped cut-out cooperating with the wedge shaped segment exerting a force on the first graduation-scale carrier member in the measuring direction when a force orthogonal to the measuring direction is exerted on the fixing element.

3. The device as recited in claim 2 further comprising one of an incremental linear and angle measuring instrument attached to the first graduation-scale carrier member, positioned to scan said first graduation-scale carrier member.

4. The device as recited in claim 2 wherein the adjusting device includes a fixing element, the fixing element having one of a fixing element wedge-shaped cut-out and a wedge-shaped protuberance.

5. A method for mechanically adjusting a first graduation-scale carrier member in a measuring direction, a cut-out being provided in the first graduation-scale carrier member, the method comprising:
   mating an adjusting device to the cut-out; and
   adjusting setting screws in a fixing element of the adjusting device to exert a force orthogonal to a plane of the measuring direction onto the fixing element, the force being converted by wedge-shaped form locking connections between the fixing element and a corresponding segment of the first graduation-scale carrier member into an adjusting force acting in the plane of the measuring direction on the first graduation-scale carrier member, the adjusting force having a component in the measuring direction and another component orthogonal to the measuring direction, such that the first graduation-scale carrier member is held fixed orthogonally to the measuring direction and is shifted parallel to the measuring direction.

6. The method according to claim 5, wherein the adjusting step further comprises placing in cooperative form-locking relationship a wedge shaped segment, extending from one of the graduation scale member and the adjusting device, with a wedge shaped cut-out, defined by the other of the graduation scale member and the adjusting device.

* * * * *